United States Patent [19]
Kurimoto

[11] Patent Number: 6,027,146
[45] Date of Patent: Feb. 22, 2000

[54] MERGING PIPE AND METHOD OF MANUFACTURING SAME

[75] Inventor: Tooru Kurimoto, Aichi-ken, Japan

[73] Assignee: Sango Co., Ltd., Nagoya, Japan

[21] Appl. No.: 08/852,510

[22] Filed: May 7, 1997

[30] Foreign Application Priority Data

May 8, 1996 [JP] Japan ................................. 8-113464

[51] Int. Cl.$^7$ .................................................. F16L 41/00
[52] U.S. Cl. ................................. 285/131.1; 285/288.1
[58] Field of Search ................................. 285/FOR 137, 285/131, 132.1, 288.1, 131.1

[56] References Cited

U.S. PATENT DOCUMENTS

| | | | |
|---|---|---|---|
| 1,984,242 | 12/1934 | Trainer et al. | 285/288.1 X |
| 2,479,578 | 8/1949 | Langvand | 285/132.1 X |
| 3,376,897 | 4/1968 | Dolder et al. | 285/132.1 X |

FOREIGN PATENT DOCUMENTS

| | | |
|---|---|---|
| 206706 | 12/1959 | Austria . |
| 670287 | 1/1939 | Germany . |
| 46-31288 | 10/1971 | Japan . |
| 1-91027 | 6/1989 | Japan . |
| 2-141623 | 11/1990 | Japan . |

*Primary Examiner*—Lynne H. Browne
*Assistant Examiner*—David E. Bochna
*Attorney, Agent, or Firm*—Pillsbury Madison & Sutro LLP

[57] ABSTRACT

A merging pipe wherein branch pipes can be easily welded to each other in a joint portion even when an intersect angle $\alpha$ between axes of both the branch pipes is set to a small value to reduce merging resistance. In the merging pipe, a plurality of branch pipes are obliquely arranged and bent at their joined ends to extend in the axial direction downstream of confluence. Circumferential walls of the branch pipes adjacent to each other at the joined ends are formed into abutting walls held in close contact relation. Flange walls are formed between the abutting walls and circumferential walls of the branch pipes. The branch pipes are joined together at the abutting walls along their outer peripheral edges.

10 Claims, 10 Drawing Sheets

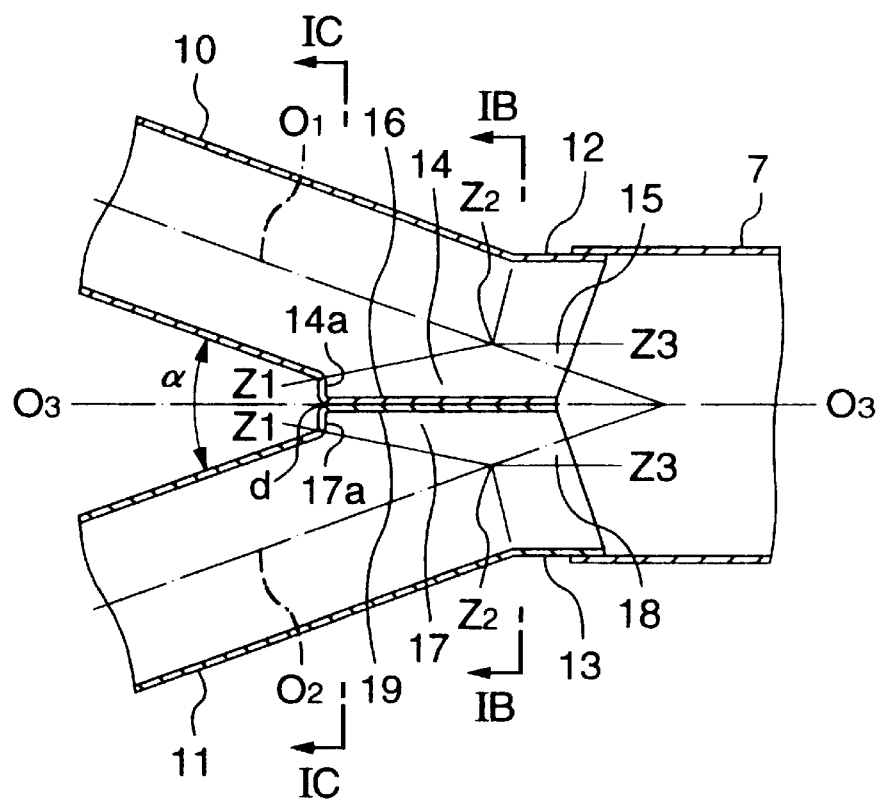
FIG. 1A
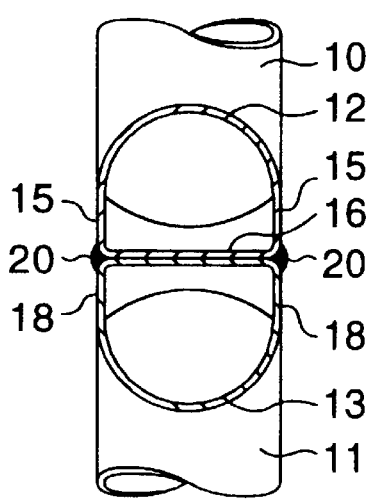
FIG. 1B
FIG. 1C

MERGING PIPE AND METHOD OF MANUFACTURING SAME

BACKGROUND OF THE INVENTION

1. Field of the Invention

The present invention relates to a merging pipe and a method of manufacturing the merging pipe.

2. Description of the Related Art

Heretofore, an engine exhaust merging pipe has been known which combines a plurality of exhaust pipes such that the exhaust pipes are obliquely arranged and joined together with their axes meeting into a common axis on the downstream side.

Such an exhaust merging pipe is constructed, by way of example, as shown in FIG. 10. Two exhaust pipes 1, 2 are cut at their downstream ends along lines X, Y crossing axes $O_1$, $O_2$ of the pipes. Cut edges 1a, 2a of the pipes are positioned to abut with each other and joined together by a weld 3 to form a joint portion, as shown in FIGS. 11 to 13. In the drawings, reference numeral 7 denotes a conjoint pipe. This exhaust merging pipe will be referred to as a first conventional merging pipe.

Another example of the exhaust merging pipe is disclosed in, e.g., JP-Y2-46-31288 and JP-U-02-141623. According to the disclosed example, as shown in FIGS. 14 to 16, two exhaust pipes 4, 5 are arranged obliquely with their axes $O_1$, $O_2$ meeting into a common axis on the downstream side. Circumferential walls of the pipes 4, 5 contiguous to each other at their downstream ends are formed into flat abutting walls 4a, 5a which are then positioned in close contact relation and joined together by a weld 6. This exhaust merging pipe will be referred to as a second conventional merging pipe.

In the above first conventional merging pipe, if the mating accuracy between the cut edges of both the exhaust pipes is poor, a welding failure, such as an unwelded hole, tends to occur. Therefore, the first conventional merging pipe requires not only high accuracy in cutting and mating of the exhaust pipes, but also a larger number of manufacturing steps. This results in the problem of pushing up the production cost.

Another problem is that because the joined edges of the pipes 1, 2 define intricate curved surfaces as shown in FIGS. 12 and 13, a difficulty is encountered in welding those joined edges and hence increases the probability of a welding failure. This problem is more serious as an intersect angle θ, shown in FIG. 12, at which outer circumferential surfaces of the pipes 1, 2 cross each other is reduced.

The above problem is magnified due to the fact that the intersect angle e can be relatively large, as shown in FIG. 12, in a downstream joint end "a" in FIG. 11, but it becomes very small particularly in an upstream joint end "b". Further, an angle a formed between the pipes 1 and 2 in an upstream crotch portion "c" is very small as shown in FIG. 11, which also poses a difficulty in welding work and magnifies the above problem in the crotch portion "c". Of course, the severity of the problem is increased as the intersect angle α between both the pipe axes is reduced.

Meanwhile, in order to reduce merging resistance of exhaust gases from the pipes 1, 2 and hold down the occurrence of unusual sounds or noises upon confluence of two exhaust gas flows, it is required to make smaller the intersect angle α between the axes of the pipes 1, 2. Also, from the viewpoint of improving exhaust performance, there is a demand for reducing the intersect angle α between both the pipe axes.

Thus, the first conventional merging pipe has not succeeded in satisfying the above-stated contradictory demands for overcoming the problem in efficiency of welding work and reducing the intersect angle from the viewpoint of improving exhaust performance.

In the second conventional merging pipe, the pipes 4, 5 have the flat opposing walls 4a, 5a and therefore the problem of leaving an unwelded hole can be avoided. However, because the demand for reducing the intersect angle a between both the pipe axes in the crotch portion necessarily makes the intersect angle α and the intersect angle θ in the joint portion set to be small, the second conventional merging pipe cannot also satisfy the contradictory demands for reducing the intersect angle between both the pipe axes and facilitating welding work. Thus, the second conventional merging pipe has accompanied the problems of requiring a large number of steps to ensure a high degree of welding accuracy and pushing up the production cost.

SUMMARY OF THE INVENTION

An object of the present invention is, therefore, to provide a merging pipe and a method of manufacturing the merging pipe, which can satisfy the above-mentioned contradictory demands for reducing the intersect angle between both the pipe axes and facilitating work of joining and welding.

To achieve the above object, according to a first aspect of the present invention, in a merging pipe wherein a plurality of branch pipes are obliquely arranged and bent at their joined ends to extend in the axial direction downstream of confluence, and abutting walls of the branch pipes held in close contact relation are joined to each other, the merging pipe includes flange walls formed between the abutting walls and circumferential walls of the branch pipes.

With the first aspect of the present invention, the flange walls are formed between the abutting walls and the circumferential walls of the branch pipes. By setting an angle formed between the flange walls in abutting relation to be large, therefore, a wide space sufficient for welding work to join the flange walls therebetween can be ensured and the welding work can be facilitated.

Also, even when an intersect angle (α) between the axes of the branch pipes is set to a small value, a wide space sufficient for welding work can be ensured, particularly in a crotch portion between the branch pipes, by the provision of the flange walls.

Further, with the provision of the flange walls, the crotch portion between the branch pipes is positioned farther away from the joint portion than in the case of providing no flange walls. Therefore, stresses caused due to the load acting upon the branch pipes can be reduced and the coupling strength of the branch pipes in the joint portion can be increased.

According to the second aspect of the present invention, in the merging pipe according to the above first aspect, the flange walls allowing one of the branch pipes and the other of the branch pipes to be continuously mated with each other are formed to lie substantially in one plane.

The welding work is more easy to perform as the flange walls welded to each other form a larger opening angle therebetween. Therefore, by forming the flange walls to lie substantially in one plate (i.e., to mate with each other at an angle close to 180 degrees) as per the second aspect of the present invention, the welding work is surely facilitated.

According to the third aspect of the present invention, a method of manufacturing a merging pipe comprises the step of press-fitting a die into each of branch pipes through an open end on the joint side at a predetermined angle with respect to an axis of each branch pipe, the die having shaping surfaces defined to form one of abutting walls serving as a joined portion of each branch pipe and inclining with respect to an axis of each branch pipe at the joined portion of the branch pipes and to form flange walls extending from the opposing walls to edges of a circumferential surface of each branch pipe, the opposing wall and the flange walls being formed at the same time upon press-fitting of the die into each branch pipe, and the step of fixedly coupling the plurality of press-formed branch pipes to each other by joining the abutting walls together.

With the third aspect of the present invention, one of the abutting walls and the flange walls can be formed at the same time just by press-fitting one die into each of the branch pipes. Further, by forming the outer surfaces of the die into desired shapes, one of the abutting walls and the flange walls can be formed into desired shapes.

BRIEF DESCRIPTION OF THE DRAWINGS

FIGS. 1A, 1B and 1C illustrate a first embodiment of a merging pipe according to the present invention, in which FIG. 1A is a sectional view, FIG. 1B is a sectional view taken along line IB—IB in FIG. 1A, and FIG. 1C is a sectional view taken along line IC—IC in FIG. 1A.

FIGS. 4A, 4B, 4C and 4D illustrate a die for deforming branch pipes of the merging pipe in FIGS. 1A, 1B and 1C, in which FIG. 4A is a side view, FIG. 4B is a bottom view, FIG. 4C is a rear view, and FIG. 4D is a sectional view taken along line IVD—IVD in FIG. 4A.

FIGS. 8A and 8B illustrate a third embodiment of the merging pipe according to the present invention, in which FIG. 8A is a sectional view and FIG. 8B is a sectional view taken along line VIIIB—VIIIB in FIG. 8A.

FIGS. 9A and 9B illustrate a fourth embodiment of the merging pipe according to the present invention, in which FIG. 9A is a sectional view and FIG. 9B is a sectional view taken along line IXB—IXB in FIG. 9A.

FIGS. 17A, 17B and 17C illustrate a fifth embodiment of the merging pipe according to the present invention, in which FIG. 17A is a sectional view, FIG. 17B is a sectional view taken along line XVIIB—XVIIB in FIG. 17A, and FIG. 17C is a plan view, looking from below, of the branch pipe before assembly.

DESCRIPTION OF THE PREFERRED EMBODIMENTS

Preferred embodiments of the present invention will be described with reference to FIGS. 1A to 9B and FIGS. 17A to 17C.

FIGS. 1A to 3 illustrate a first embodiment of the merging pipe according to the present invention and FIGS. 4A to 6 illustrate a method of manufacturing the merging pipe.

In the first embodiment shown in FIGS. 1A to 3, the merging pipe is manufactured by joining two branch pipes together at their ends. As shown, one branch pipe 10 and the other branch pipe 11 are obliquely arranged such that extensions of pipe axes $O_1$, $O_2$ cross each other.

Circumferential walls 12, 13 of the branch pipes 10, 11 in opposite relation to circumferential walls thereof facing each other in a joint portion at the pipe ends are each bent along a common axis $O_3$ downstream of the joint portion into a semicircular wall having the same diameter as the branch pipe.

Figure 3:
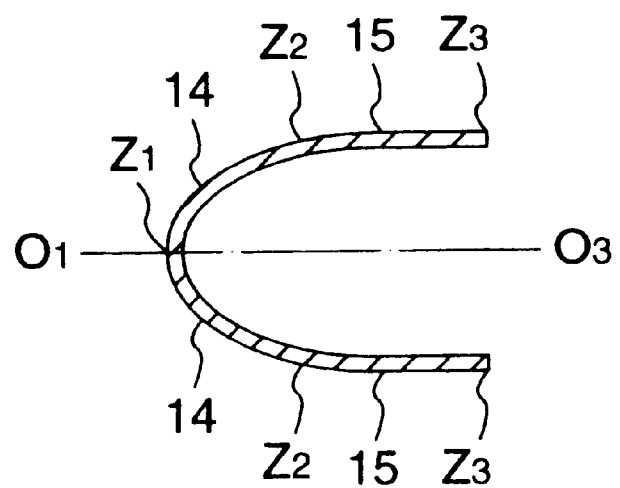
FIG. 3 is an imaginary sectional view taken along imaginary plane $Z_1$-$Z_2$-$Z_3$ in FIG. 1A.

Supposing that one branch pipe is cut along an imaginary plane $Z_1$-$Z_2$ crossing the axis $O_1$ of the branch pipe 10 and an imaginary plane $Z_2$-$Z_3$ extending from $Z_2$ along the center of radius of the circumferential wall 12, imaginary cut edges of the branch pipe 10 are defined by flange walls 14, 15 on one side and flange walls 14, 15 on the other side, these flange walls being integrally formed and symmetrical about the axis when viewed from above. As shown in FIG. 3, the imaginary cut edges along the plane $Z_1$-$Z_2$ appears as a parabolic line that curves inward from $Z_2$ on the outer side toward $Z_1$. Thus, looking from above in FIG. 1A, the flange wall 14 of the branch pipe 10 is a wall in the parabolic form symmetrical about the pipe axis $O_1$ and the flange wall 15 continuously extending from the circumferential wall 12 is a wall parallel to the axis $O_3$, as shown in FIG. 3. Further, as seen from FIG. 1A, a portion 14a of the flange wall 14 which forms a crotch portion between the branch pipes 10, 11 is projected outward beyond the outer circumferential surface of the branch pipe 10.

Reference numeral 16 denotes one of abutting walls which is integrally formed with and bent from respective projecting ends of the flange walls 14, 14a, 15. The wall 16 is in the form of a flat plate lying in a plane in alignment with the axis $O_3$ downstream of the joint portion and perpendicular to a plane connecting the axes $O_1$, $O_2$ of the pipes 10, 11.

Also, a joined end of the other branch pipe 11 has a similar shape as the joined end of the one branch pipe 10. Specifically, the joined end of the other branch pipe 11 is defined by a flange wall 17, a flange wall 17a, a flange wall 18, and the other 19 of the abutting walls, which correspond to the flange wall 14, the flange wall 14a, the flange wall 15, and the one 16 of the abutting walls, respectively.

Figure 2:
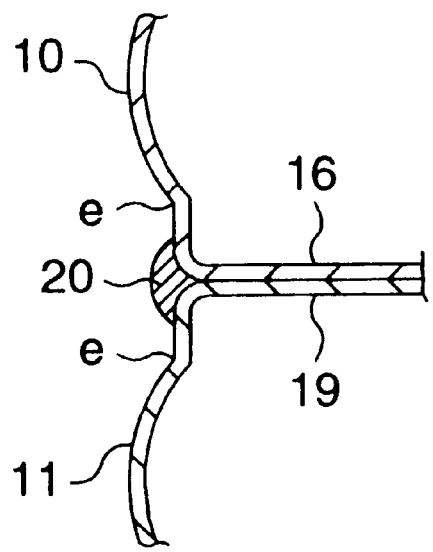
FIG. 2 is an enlarged sectional view of a part of FIG. 1C.

Then, the merging pipe is fabricated by combining the branch pipes 10, 11 such that the abutting walls 16, 19 are mated in close contact with each other as shown in FIG. 1A, and then fixedly joined together by a weld 20 at their mated outer peripheral ends as shown in FIG. 2.

In the welding step, since the flange walls 14, 14a, 15, 17, 17a, 18 are formed all over the outer peripheral edges of the abutting walls 16, 19 and the flange walls defining welded edges lie in one plane as viewed in each section, welded surfaces mate at 180 degrees, namely, the above-mentioned intersect angle θ is 180 degrees, and therefore welding work can be very easily performed all over the outer peripheral edges of the abutting walls 16, 19 to be welded. In particular, even when an intersect angle a formed between the branch pipes 10 and 11 in their crotch portion "d" is small for the reason, for example, that the branch pipes 10, 11 are used as upstream exhaust pipes and the intersect angle α formed between the axes of the branch pipes 10 and 11 is set to be small to reduce merging resistance of two exhaust gas flows in the confluence region, a wide space for welding work is left by the presence of the flange walls 14a, 17a with the welded surfaces mating at 180 degrees, a gap sufficient for insertion of a welding torch is ensured, and the welding work can be easily performed with reliability.

Therefore, as a result of facilitation of the welding work, welding quality can be stabilized and production cost can be reduced.

Further, with the provision of the flange walls 14, 14a, 17, 17a, leftmost ends of the abutting walls 16, 19 in FIG. 1A are shifted to the left from the meeting point (i.e., the imaginary originating point of the crotch portion) at which the extended circumferential surfaces of the branch pipes 10, 11 without having the flange walls 14a, 17a would join to each other. Therefore, a contact area between the abutting walls 16 and 19 is enlarged, resulting in higher mechanical strength than that obtainable with the conventional merging pipes not having the flange walls 14a, 17a. Additionally, by welding the flange walls 14a, 17a in the crotch portion "d", points upon which moments imposing on the branch pipes 10, 11 act (i.e., the actual originating point of the crotch portion) are shifted toward the points at which forces are applied to the branch pipes 10, 11 (i.e., to the left in FIG. 1A). Therefore, resultant moments are reduced and the mechanical strength can be enhanced remarkably as compared with the conventional merging pipes.

Figure 13:
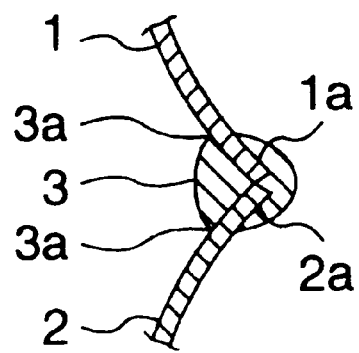
FIG. 13 is an enlarged sectional view showing a welded portion in FIG. 12.
Figure 14:
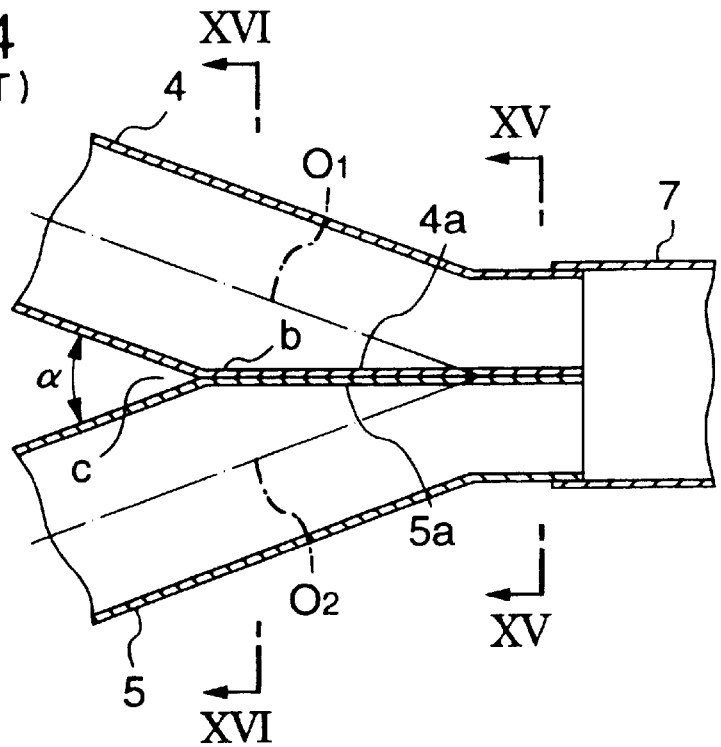
FIG. 14 is a sectional view of a second conventional merging pipe.
Figure 15:
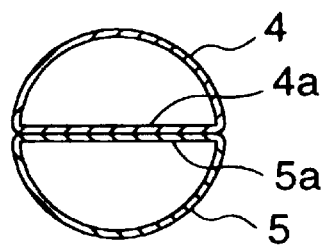
FIG. 15 is a sectional view taken along line XV—XV in FIG. 14.
Figure 16:
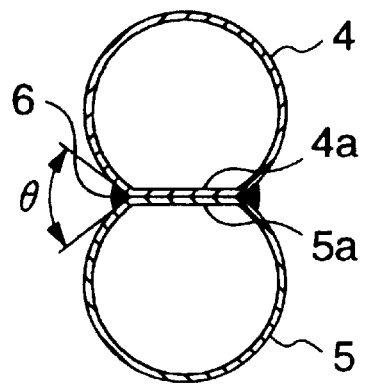
FIG. 16 is a sectional view taken along line XVI—XVI in FIG. 14.

Furthermore, maximum stresses, such as thermal strains caused when the pipes are actually installed on a motor vehicle, are produced at terminated ends 3a of weld beads, shown in FIG. 13, in the first and second conventional merging pipes, while they are produced in bent portions "e", shown in FIG. 2, corresponding to the imaginary plane $Z_1$-$Z_2$ in the above-described embodiment of the present invention. Accordingly, it is possible to disperse concentrated stresses and enhance the fatigue strength by changing the curvature of the bent portions "e" as desired.

The method of manufacturing the merging pipe will be described below with reference to FIGS. 4A to 6.

Figure 4A:
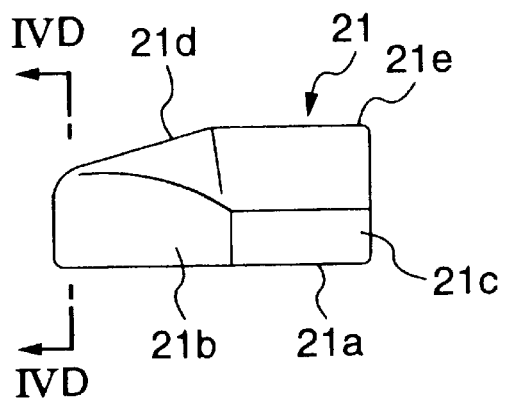
Figure 4B:
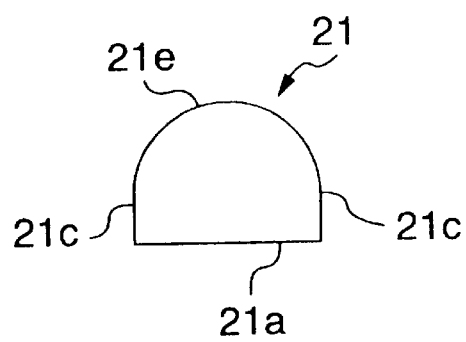
Figure 4C:
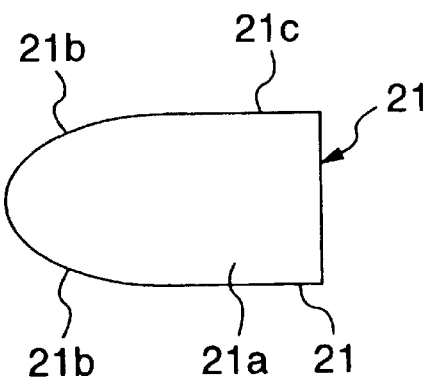
Figure 4D:
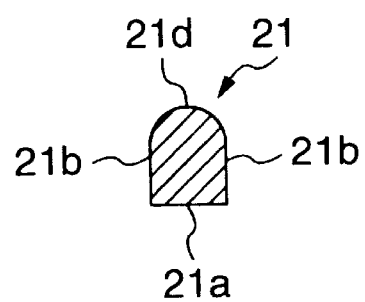

FIGS. 4A, 4B, 4C and 4D illustrate a die for use in manufacturing the merging pipe, in which FIG. 4A is a side view, FIG. 4B is a bottom view, FIG. 4C is a rear view, and FIG. 4D is a sectional view taken along line IVD—IVD in FIG. 4A. A die 21 has a bottom surface 21a, front opposite side surfaces 21b, 21b, rear opposite side surfaces 21c, 21c, a front upper surface 21d, and a rear upper surface 21e. The bottom surface 21a is formed to have the same shape as the inner surface of one 16 of the abutting walls of the one branch pipe 10. The front opposite side surfaces 21b, 21b are formed into parabolic surfaces having the same shape as the inner surfaces of both the flange walls 14, 14, converging toward a fore end of the die, and extending vertically upward from the bottom surface 21a. The rear opposite side surfaces 21c, 21c are formed into vertical surfaces having the same shape as the inner surfaces of the flange walls 15, 15 and extending parallel to each other in the longitudinal direction. The front upper surface 21d is formed into a surface inclining downward toward the fore end of the die and curving from a top at the center downward in the transverse direction. The rear upper surface 21e is formed into a semicircular surface having the same radius as that of the one branch pipe 10.

Figure 5:
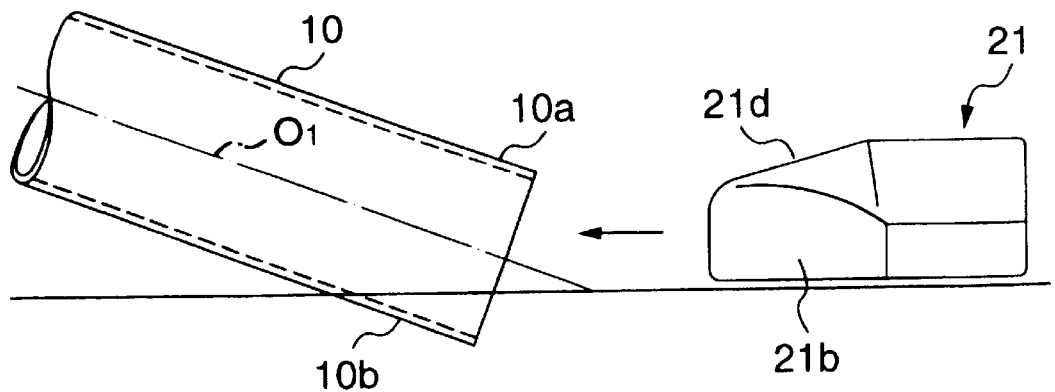
FIG. 5 is a view for explaining a method of deforming the branch pipe, the view showing an arrangement of the branch pipe in FIG. 1 and the die in a state before press-fitting.
Figure 6:
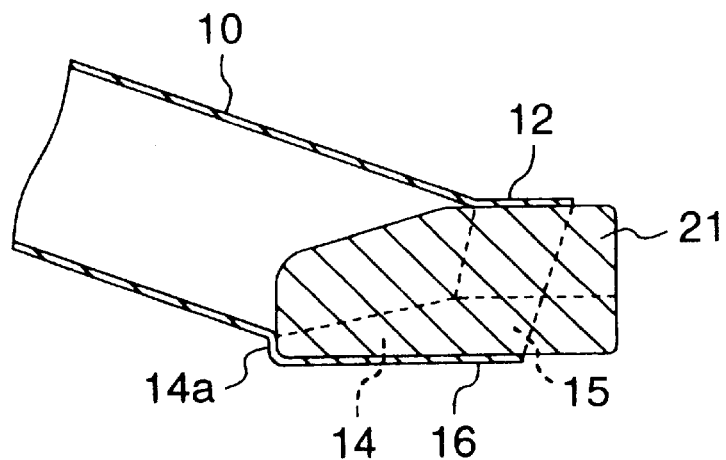
FIG. 6 is a view showing a deforming step with the die press-fitted into the die from the state of FIG. 5.

As shown in FIG. 5, the one branch pipe 10 to be deformed is arranged in a state inclined at a merging angle and held in the inclined state by any suitable means. The die 21 in a horizontal state is then press-fitted into the one branch pipe 10 through its open end by any suitable driving means. With the press-fitting of the die 21, an upper wall 10a at the open end of the branch pipe 10 is pushed upward by the front upper surface 21d of the die 21, and at the same time a lower wall 10b at the open end of the branch pipe 10 is pulled upward. By further press-fitting the die 21 into the branch pipe 10, the open end of the branch pipe 10 is finally bent or deformed along the outer surfaces of the die 21 as shown in FIG. 6. As a result, the walls 12, 14, 14a, 15, 16 of the branch pipe 10 in the joint portion, described in connection with FIGS. 1A, 1B and 1C, are formed.

It is to be noted that the respective walls of the branch pipe 10 may be formed by using an external die corresponding to the die 21.

The other branch pipe 11 is also deformed by using the die 21 in a like manner to described above.

Then, the branch pipes 10, 11 thus deformed are welded together into a one-piece structure as shown in FIGS. 1A, 1B and 1C. A conjoint pipe 7 is finally fitted and fixedly welded to the ends of the joined branch pipes 10, 11.

Figure 7:
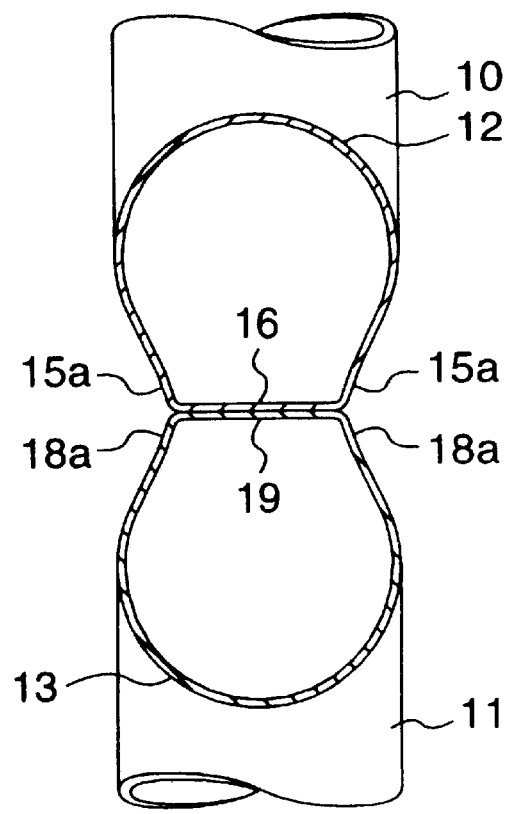
FIG. 7 is a sectional view taken along line corresponding to IB—IB in FIG. 1, the view showing a second embodiment of the merging pipe according to the present invention.

A second embodiment shown in FIG. 7 will be described below.

In this second embodiment, the flange walls 14, 14a, 15, 17, 17a, 18 are formed to be not perpendicular to the abutting walls 16, 19 like the first embodiment, but inclined to define an obtuse angle (internal angle) within such a range as not deteriorating easiness of welding. FIG. 7 is a sectional view taken along line corresponding to the IB—IB line in FIG. 1A. Flange walls modified in this second embodiment are denoted by 15a, 18a. The remaining structure is the same as in the above first embodiment.

A die used for forming the flange walls of the branch pipe in this second embodiment is modified such that the front and rear opposite side surfaces 21b, 21c in the die 21 are formed into surfaces inclining corresponding to the inclination of the flange walls.

With the second embodiment, the load to be applied in a step of forming the flange walls can be reduced and the branch pipe can be deformed into a predetermined shape more stably.

Figure 8A:
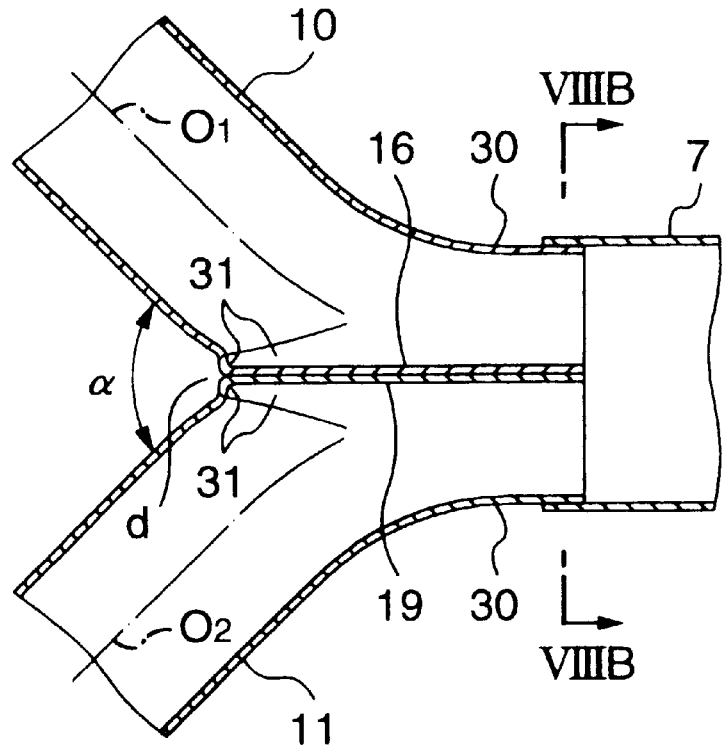
Figure 8B:
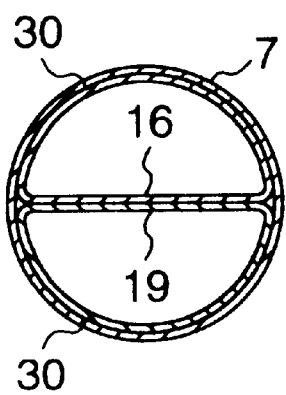

A third embodiment shown in FIGS. 8A to 8B will be described below.

In this third embodiment, joined ends 30, 30 of the one branch pipe 10 and the other branch pipe 11 are each deformed into a semicircular shape (D-shape). Only near the crotch portion between the branch pipes 10, 11, flange walls 31, 31 are formed to have similar shapes as those of the flange walls 14, 14a, 17, 17a in their areas near the crotch portion in the above first embodiment.

A forming die for use in this third embodiment is modified such that a portion of the die press-fitted into the joined end 30 has a semicircular shape, and the die has a fore end having outer opposite surfaces similar to the parabolic front opposite side surfaces 21b, 21b of the above die 21 in their fore ends.

With the merging pipe of this third embodiment, since the joined ends 30, 30 of the blanch pipes 10, 11 provide an outer peripheral surface in the form of a true circle when mated to each other, the conjoint pipe 7 in the form of a true circle can be fitted to the joined ends 30, 30 regardless of orientation of the conjoint pipe 7 and work of coupling the pipes is facilitated. In other words, similar performance and advantages as those in the above first embodiment can also be achieved when the joined ends of the branch pipes are to be formed into a true circle for the purpose of facilitating the coupling work of the conjoint pipe 7.

Figure 9A:
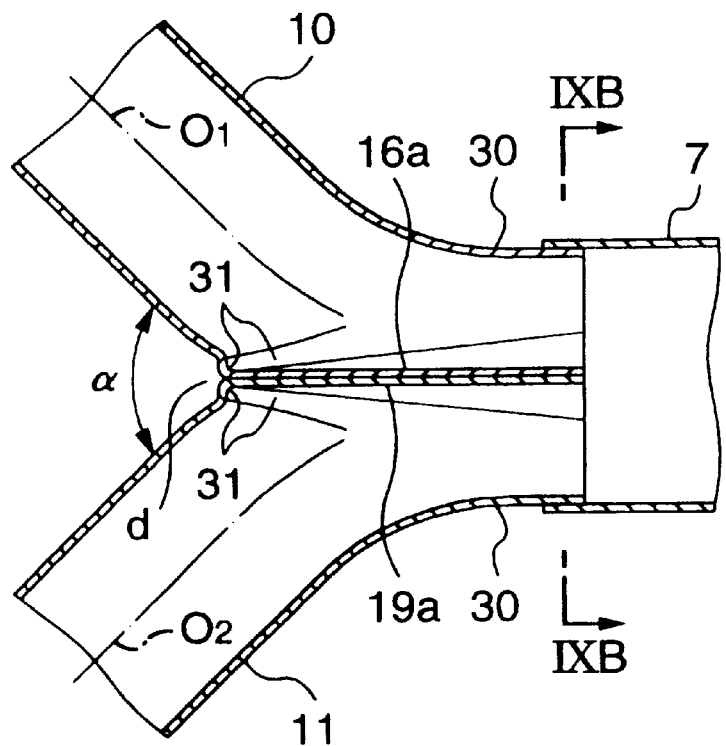
Figure 9B:
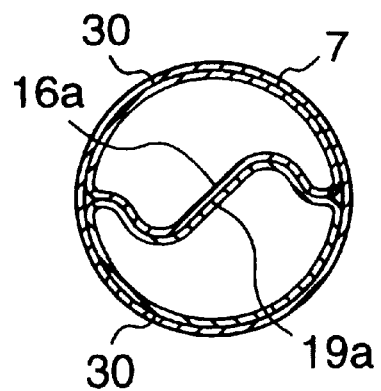
Figure 10:
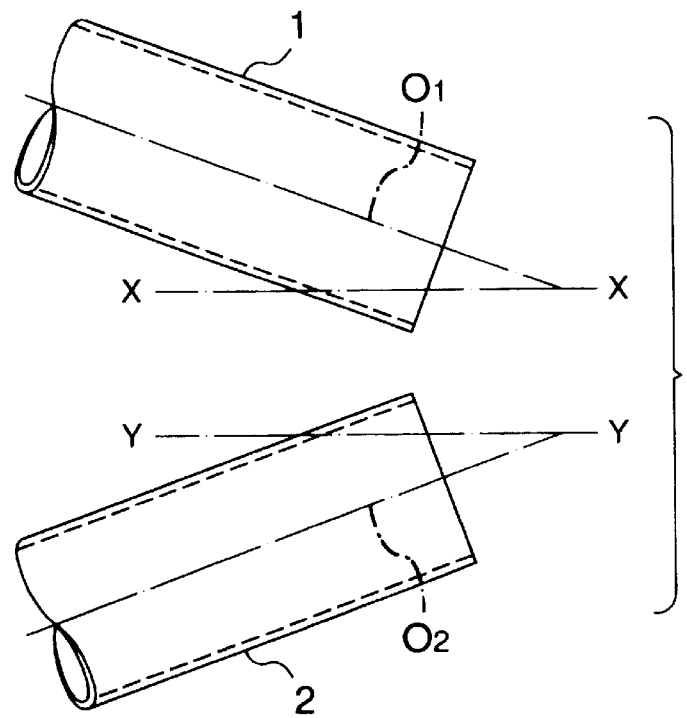
FIG. 10 is an explanatory view showing a step of manufacturing a first conventional merging pipe in which two branch pipes are cut.
Figure 11:
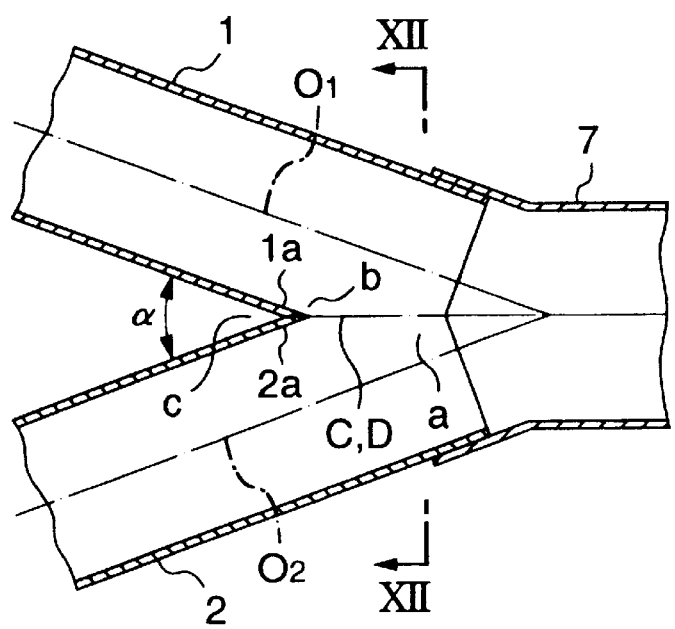
FIG. 11 is a sectional view of the first conventional merging pipe.
Figure 12:
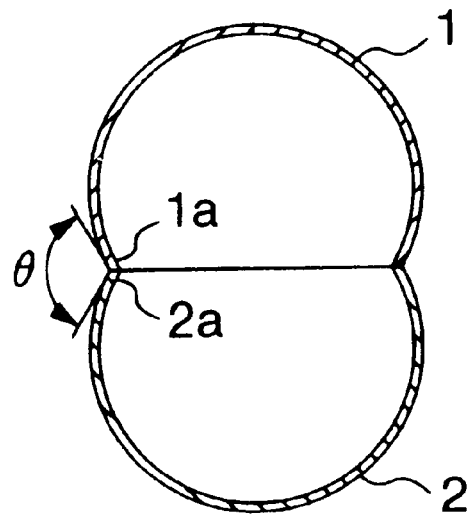
FIG. 12 is a sectional view taken along line XII—XII in FIG. 11.

A fourth embodiment shown in FIGS. 9A to 9B will be described below.

In this fourth embodiment, the abutting walls 16, 19 in the above third embodiment are modified into wavy abutting walls 16a, 19a which have a wavy shape in the direction perpendicular to the pipe axis. The remaining structure is the same as in the above third embodiment.

A die used for forming the merging pipe in this fourth embodiment is modified such that the bottom surface of the die used in the above third embodiment is formed into a wavy shape.

With this fourth embodiment, it is possible not only to achieve similar performance and advantages as those in the above first embodiment, but also prevent the joint portion from breaking even if the wavy abutting walls 16a, 19a are subjected to thermal expansion and contraction caused when a high-temperature fluid is passed through the pipes.

Figure 17A:
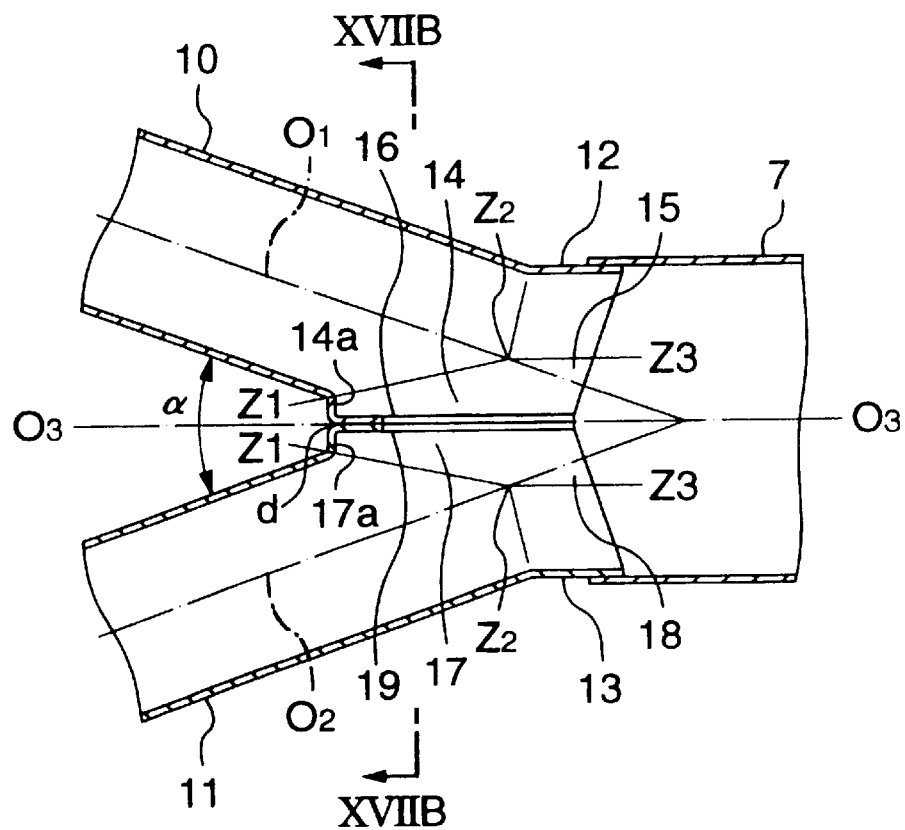
Figure 17B:
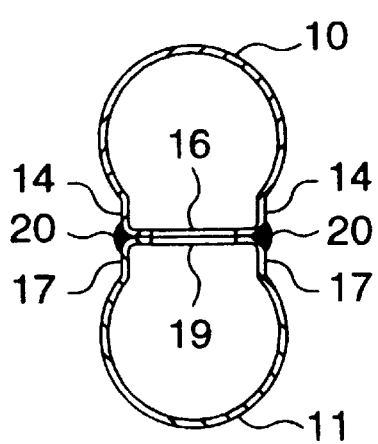
Figure 17C:
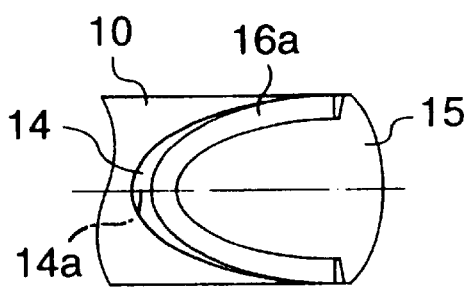

FIGS. 17A, 17B and 17C illustrate a fifth embodiment of the merging pipe according to the present invention. In this fifth embodiment, instead of joining the abutting walls 16, 19 together, as they are, like the above first embodiment shown in FIG. 1A, the abutting walls 16, 19 are cut out by, e.g., laser machining after deforming the branch pipes 10, 11 into the predetermined shape, such that only peripheral portions 16a, 19a of the abutting walls 16, 19 are left while the other portions thereof are removed, as shown in FIG. 17C. Then, the branch pipes 10, 11 may be welded to each other.

By thus leaving only the peripheral portions of the abutting walls and removing the other portions thereof, there is no walls in an area where fluids in the branch pipes merge with each other. This results in advantages that the merging pipe can merge the fluids more smoothly while keeping high coupling strength thereof, and the total weight of the merging pipe is reduced.

In the embodiments described above, small holes may be bored in the abutting walls 16, 16a, 19, 19a to enhance the effect of suppressing noises.

Also, in the above embodiments, the one branch pipe 10 and the other branch pipe 11 are not necessarily positioned adjacent to each other such that the pipe axes $O_1$, $O_2$ meet at one point on the common axis $O_3$. For example, the branch pipes 10, 11 may be obliquely arranged to offset from each other in the direction vertical to the drawing sheet in FIG. 1A, or may be such that the pipe axes $O_1$, $O_2$ meet a point offset from the common axis $O_3$.

Further, the above embodiments employ two branch pipes, but the number of branch pipes is not limited to two, but may be three or more.

In the above embodiments, the branch pipes 10, 11 are explained as upstream pipes, the conjoint pipe 7 as a downstream pipe, and the entire assembly as a merging pipe for the sake of description. However, the merging pipe can also be employed as a branching pipe by using the branch pipes 10, 11 as downstream pipes and the conjoint pipe 7 as an upstream pipe. Accordingly, the present invention includes a branching pipe of the above-stated structure as well.

Additionally, the present invention is not limited in its application to an engine exhaust system, but also applicable to an engine intake system. Furthermore, the present invention can also be applied to other general piping systems than the engine exhaust and intake systems.

As fully described above, according to the first and second aspects of the present invention, since the merging pipe has the abutting walls, a welding failure, such as an unwelded hole, tending to occur in the first conventional merging pipe can be avoided and the problem of the first conventional merging pipe can be overcome.

Since the provision of the flange walls ensures a wide space for welding work even when the intersect angle between the axes of the branch pipes is set to a small value, the contradictory demands for reducing the intersect angle between both the pipe axes to diminish merging resistance and facilitating welding work can be satisfied.

Further, as a result of facilitation of the welding work, welding quality can be stabilized and production cost can be reduced. In addition, since the crotch portion between the branch pipes is positioned farther away from the joint portion than in the conventional merging pipes, stresses caused in the crotch portion can be reduced and the coupling strength of the branch pipes in the joint portion can be increased.

According to the third aspect of the present invention, the merging pipe capable of achieving the above advantages can be easily manufactured.

What is claimed is:

1. A merging pipe in which a plurality of branch pipes are obliquely arranged and bent at their joined ends to extend in the axial direction downstream of confluence, including abutting walls formed as part of said branch pipes, and said abutting walls of said branch pipes held in close contact relation are joined to each other, wherein said merging pipe includes flange walls formed as part of said branch pipes continuously between said abutting walls and circumferential walls of said branch pipes, and wherein, at at least a crotch portion of the joined portion of said merging pipe, a portion of each of said flange walls is projected outwardly from an outer peripheral surface of each respective branch pipe, and both said projected portions of the flange walls are mated with each other.

2. A merging pipe according to claim 1, wherein said flange walls allowing one of said branch pipes and the other of said branch pipes to be continuously mated with each other are formed to lie substantially in one plane at at least the crotch portion.

3. A merging pipe according to claim 1, wherein said flange walls allowing one of said branch pipes and the other of said branch pipes to be continuously mated with each other form a large opening angle therebetween.

4. A merging pipe according to claim 1, wherein the portions of said flange walls directly adjacent their respective abutting walls form an obtuse angle therebetween.

5. A merging pipe, comprising:

a first branch pipe including an integral circumferential wall, an integral flange wall and an integral abutting wall, the flange wall connecting the abutting wall to the circumferential wall;

a second branch pipe including an integral circumferential wall, an integral flange wall and an integral abutting wall, the flange wall connecting the abutting wall to the circumferential wall;

wherein the abutting wall of the first branch pipe is positioned adjacent and connected to the abutting wall of the second branch pipe to join the two branch pipes together at an oblique angle, and wherein, at at least a crotch portion of the connected portion of said merging pipe, a portion of each flange wall is projected outwardly from an outer peripheral surface of each respective branch pipe, and both said projected portions of the flange walls are mated with each other.

6. A merging pipe according to claim 4, wherein at least a portion of the first branch pipe flange wall is mated with at least a portion of the second branch pipe flange wall to form a large angle therebetween.

7. A merging pipe as in claim 4, wherein at least a portion of the first branch pipe flange wall lies substantially in a same plane as at least a portion of the second branch pipe flange wall.

8. A merging pipe according to claim 4, wherein at least a portion of the first branch pipe flange wall is mated with at least a portion of the second branch pipe flange wall to form an obtuse angle therebetween.

9. A merging pipe, comprising:

a first branch pipe including an integral circumferential wall, an integral flange wall and an integral abutting wall, the flange wall connecting the abutting wall to the circumferential wall, a portion of the flange wall projecting outwardly from an outer surface of the circumferential wall;

a second branch pipe including an integral circumferential wall, an integral flange wall and an integral abutting wall, the flange wall connecting the abutting wall to the circumferential wall, a portion of the flange wall projecting outwardly from an outer surface of the circumferential wall;

wherein the abutting wall of the first branch pipe is positioned adjacent and connected to the abutting wall of the second branch pipe to join the two branch pipes together at an oblique angle.

10. A merging pipe as in claim 9, wherein at least a portion of the first branch pipe flange wall lies substantially in a same plane as at least a portion of the second branch pipe flange wall.

* * * * *